United States Patent

[11] 3,610,362

[72] Inventors  Koichi Toyama
　　　　　　　Toyohashi-shi;
　　　　　　　Atutoshi Okamoto, Toyohashi-shi; Shunji
　　　　　　　Okumura, Kariya-shi, all of Japan
[21] Appl. No.  878,827
[22] Filed      Nov. 21, 1969
[45] Patented   Oct. 5, 1971
[73] Assignee   Nippon Denso Kabushiki Kaisha
　　　　　　　Kariya-shi, Aichi-ken, Japan
[32] Priority   Dec. 21, 1968
[33]            Japan
[31]            43/94021

[54] ANTISKID DEVICE WITH CLUTCH RELEASING MEANS
　　 1 Claim, 2 Drawing Figs.
[52] U.S. Cl. .................................................. 180/82,
　　　　　　　　　　　　　　　　　　　　192/13, 303/21 CF
[51] Int. Cl. ................................................ F16d 67/02
[50] Field of Search. ................................. 192/13 X;
　　　　　　　　　　　　　　303/21 CG, 21 CE, 21 CF; 180/82

[56]            References Cited
                UNITED STATES PATENTS
2,212,904  8/1940  Stone ................................. 192/3
3,507,544  4/1970  Wakamatsu et al. ........... 303/21 CG Primary Examiner—Arthur L. La Point
Assistant Examiner—George H. Libman
Attorney—Cushman, Darby & Cushman ABSTRACT: An antiskid device with clutch releasing means comprising a wheel speed-detection circuit adapted to convert the speed of a wheel into a DC voltage and provide a wheel speed voltage from said DC voltage, a reference wheel speed-establishing circuit adapted to store said DC voltage across a capacitor and discharge the stored charge in the capacitor with a time constant corresponding to a predetermined wheel deceleration to thereby produce a reference wheel speed, a circuit for comparing the wheel speed voltage from the wheel speed-detection circuit and the terminal voltage of said capacitor representing the reference wheel speed voltage from the reference wheel speed-establishing circuit to thereby detect the wheel deceleration, a relay circuit adapted to be actuated by the output from said comparator circuit to energize a braking force releasing solenoid valve, an AND circuit adapted to perform a logical operation on the output signal from the relay circuit and a signal produced by the opening and closing of a brake switch, a switch element actuated by the output from the AND circuit to energize a clutch-releasing solenoid, a holding circuit adapted for actuation upon the closing of said switch element to maintain the continued energization of the clutch-releasing solenoid even after the output from said AND circuit has ceased to exist, and a switch element to force the operation of the holding circuit to stop, whereby, as the deceleration of the wheels approaches a preset wheel deceleration, the braking force applied to the vehicle is intermittently released and simultaneously the clutch is released to uncouple the wheels and the engine such that the rotation of the wheels may be readily restarted, even on road surfaces, such as, a snowy frozen road surface where the friction coefficient between the wheel and the road is small, thereby effectively preventing the vehicle from skidding with locked wheels.

PATENTED OCT 15 1971     3,610,362

INVENTORS
Koichi Toyami
Hitoshi Okamoto
Shunji Okamura

BY Cushman, Darby & Cushman
ATTORNEYS

ANTISKID DEVICE WITH CLUTCH RELEASING MEANS

BACKGROUND OF THE INVENTION

1. Field of the Invention

The present invention generally relates to antiskid devices and more particularly to an antiskid device with a clutch-releasing means so designed that uncontrollability of the steering wheel, spin or irregular gyration of the vehicle, etc. may be effectively prevented, which will be caused by a so-called skid, that is, by a vehicle slipping with the locked wheels as the rotation of the wheels stops upon emergency braking of the wheel through application of the brakes while it is running, for example, on a snowy frozen road surface where the friction coefficient between the wheel and the road surface is small.

2. Description of the Prior Art

Conventional antiskid devices for automobiles have in fact, as their sole object how to effectively slow down the speed of a vehicle without causing the wheels to stop rotating when the brakes are suddenly applied to the vehicle. Most of the antiskid devices employ a flywheel mechanism to detect the angular deceleration in a wheel-driving axle shaft which is correlated with the peripheral wheel deceleration (in meter/sec.$^2$) of the vehicle, and the annular deceleration thus detected is then utilized in the manner designed to reduce the braking force applied to the wheel by means of a hydraulic or electromagnetic transmission mechanism to thereby prevent the skidding of the vehicle and the accompanying uncontrollability of the steering wheel, spin of the vehicle and the like which may occur when the wheels stop rotating under an excessively large braking force.

FIG. 1 is a schematic diagram showing the construction of the driving axle shaft angular deceleration detector used in a conventional electromagnetic antiskid device and the connections of the electrical system of the device including said detector. The angular deceleration detector 1 is designed to function such that when an angular deceleration occurs in a shaft 2 coupled to the driving axle shaft, a rotational torque is developed in a flywheel 3 causing a relative rotational movement between the flywheel 3 and the shaft 2 until a return spring 4 is overcome, whereupon the flywheel 3 changes its position. As this rotational movement takes place along the thread, the flywheel 3 moves axially of the shaft 2 (in the direction of the arrow A). This movement is then amplified by means of a lever to provide a driving force for closing an electrical contact 6. Numeral 7 designates a relay for relaying current to a solenoid valve 9 from a power source 8 upon closing of the contact 6. Numeral 10 designates a pilot lamp which indicates that the solenoid valve 9 is being energized. This solenoid valve 9, when energized, functions to reduce the braking force applied to the wheels to thereby prevent the stoppage of rotation of the driving axle shaft. With such devices, however, the braking force applied to the wheels is released only when the angular wheel deceleration signal is present and therefore they are open to an objection that the conditions for effective braking are extremely limited and that a satisfactory antiskid control operation may not be obtained equally under different circumstances where the coefficient of friction between the wheel and the road surface varies greatly, such as in the case of a concrete-paved road surface and a snowy frozen road surface. For example, if the value at which the angular wheel deceleration signal is to be generated is predetermined so as to obtain a braking force which will be effective on a concrete-paved surface where the friction coefficient is large, even though the braking force acting on the wheels has been released, the wheels inevitably tend to stop rotating within a considerably short period of time due to the delayed operation of the control system. Then, as the angular deceleration no longer exists in the wheels, the braking force is applied again to the wheels in spite of the fact that the wheels have already stopped rotating, with the great likelihood of causing a so-called skid in which the vehicle slips with the wheels being locked. Moreover, when emergency braking of the vehicle must be made in this case, thus allowing no time to release the clutch and the clutch is in the coupling position, such stoppage of rotation of the wheels inevitably stops the operation of the engine. Thus, in order to release the braking force on the vehicle and accelerate it, the engine must first be started again by means of some other driving source before the acceleration of the vehicle can take place. Indeed, the wheels will not stop rotating even on such a snowy frozen road surface, if the value is predetermined so that the angular wheel deceleration signal may be generated in response to a very small angular deceleration. But this involves the problem of a considerably extended stopping distance required for the vehicle to come to a complete standstill, which is an especially big difficulty on a concrete-paved road surface, thus manifesting the drawback that the merit of installing an antiskid device becomes null and void.

SUMMARY OF THE INVENTION

The object of the present invention is therefore to provide an antiskid device with a clutch releasing means comprising a wheel speed-detection circuit adapted to convert the speed of a wheel into a DC voltage and produce a wheel speed voltage from said DC voltage, a reference wheel speed-establishing circuit adapted to store said DC voltage across a capacitor and discharge the stored charge in the capacitor with a time constant corresponding to a predetermined wheel deceleration to establish a reference wheel speed, a circuit for comparing the wheel speed voltage from the wheel speed-detection circuit and the terminal voltage of said capacitor representing the reference wheel speed voltage from the reference wheel speed-establishing circuit, a relay circuit adapted to be actuated by the output from said comparator circuit to energize a braking force releasing solenoid valve, and AND circuit adapted to perform a logical operation on the output signal from the relay circuit and a signal produced by the opening and closing of a brake switch, a switch element actuated by the output from the AND circuit to energize a clutch-releasing solenoid, a holding circuit adapted for actuation upon the closing of said switch element to maintained the continued energization of the clutch-releasing solenoid even after the output from said AND circuit has ceased to exist, and a switch element to force the operation of the holding circuit to stop.

With the arrangement described above, the device according to the present invention is advantageous in that when the deceleration of the wheels approaches a predetermined wheel deceleration upon application of the brakes, the braking force applied to the vehicle is intermittently released and the clutch is kept in its uncoupling position until the switch element is actuated by a first braking force releasing signal, whereby the engine is permitted to run with no load put thereon to thereby prevent the engine from stalling its operation due to the stoppage of rotation of the wheels. On the other hand, for acceleration of the vehicle, the switch element is temporarily opened to engage the clutch so that the wheels are not rotated by virtue of the engine to thereby effect the acceleration of the vehicle with a considerable smoothness even though the friction coefficient between the wheel and the road surface is very small, as in the case of a snowy frozen road surface. This eliminates all the possibility of the so-called skidding of a vehicle in which it is caused to slide or skid with the wheels whose rotation is stopped due to ceased operation of the engine, and moreover, the vehicle can be efficiently and safely braked and stopped with no great incidental variations in the braking force as well as in the speed of the vehicle. These are the remarkable effects attributable to the present invention.

DESCRIPTION OF THE PREFERRED EMBODIMENT

Figure 1:
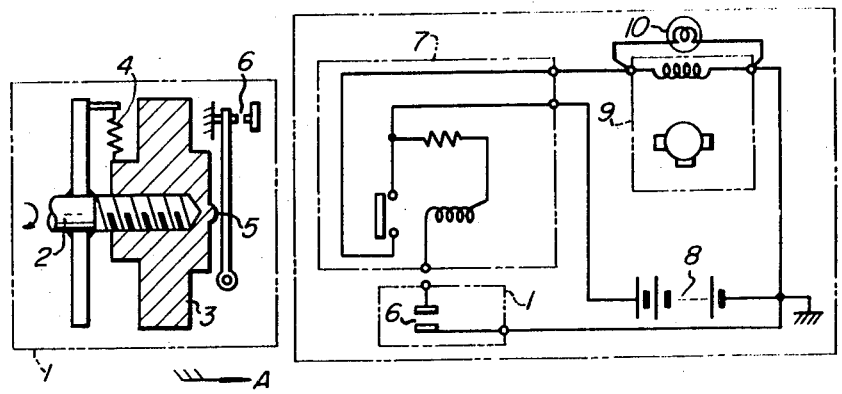
FIG. 1 is a schematic diagram showing the construction of a conventional electromagnetic type antiskid device for automobiles.
Figure 2:
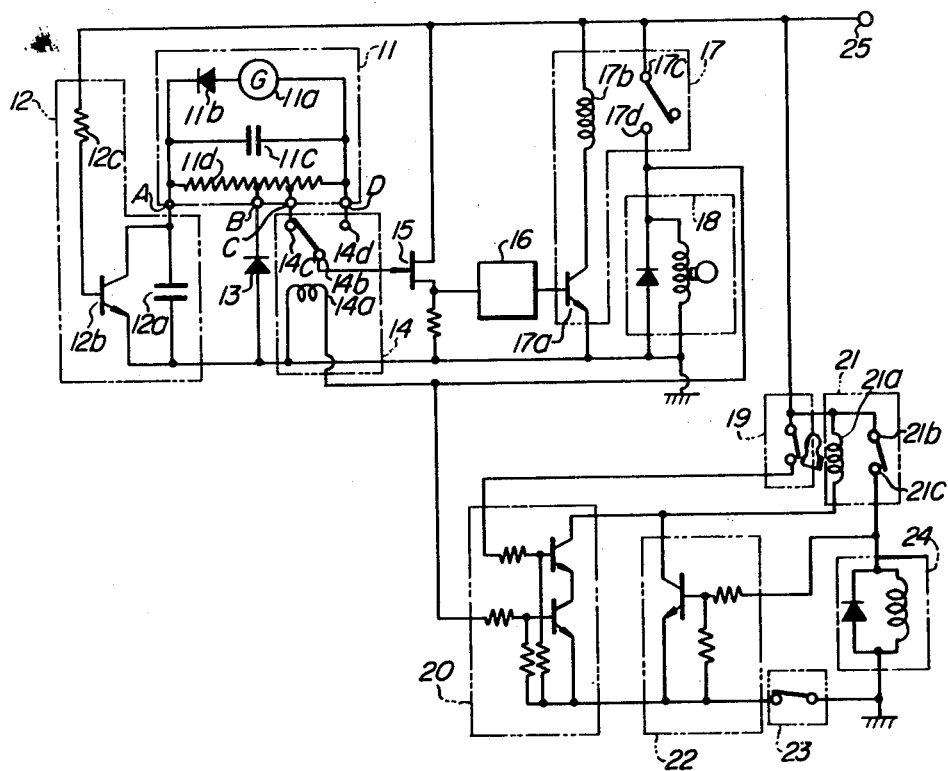
FIG. 2 is a wiring diagram showing an embodiment of the antiskid device with a clutch-releasing means according to the present invention.

The present invention will be explained hereinafter in conjunction with the embodiment shown in the drawing. Referring to FIG. 2, numeral 11 designates a wheel speed-detection circuit; 11a an AC generator coupled, for example, to a driving axle shaft to produce an AC voltage proportional to the wheel speed. Numeral 11b designates a diode to rectify said AC voltage, 11c a smoothing capacitor for smoothing out the rectified output of the diode 11b; 11d a smoothing resistor provided with taps A, B and C. Numeral 12 designates a reference wheel speed-establishing circuit to produce a reference wheel speed; 12a a capacitor for storing a DC voltage developed across the taps A and B; 12b a transistor adapted to discharge the charge in the capacitor 12a with a time constant corresponding to a predetermined wheel deceleration of, for example, 0.6 g. (where g. is the acceleration due to gravity) such that the discharging characteristic curve of the capacitor 12a represents the reference wheel speed and the voltage across the terminals of the capacitor 12a represents the reference wheel speed voltage. Numeral 12c designates a resistor which determines the discharging time constant with which the charge in the capacitor 12a is discharged through the transistor 12b, that is, the reference wheel speed. Numeral 13 designates a diode which forms the charging circuit for the capacitor 12a and functions to prevent the charge in the capacitor 12a from flowing back through this charging circuit. Numeral 14 designates a wheel speed voltage changeover circuit composed of a relay circuit consisting of an exciting coil 14a, a movable contact 14b, fixed contacts 14c and 14d, the movable contact 14b being normally held against the fixed contact 14c so that the movable contact 14b and the fixed contact 14d close when the exciting coil 14a is energized. Although a relay is used for the wheel speed voltage change circuit 14 in this embodiment, it may be replaced, for example, with a transistor relay circuit. Numeral 15 designates a field effect transistor with a high-input resistance; 16 a fixed voltage level detector circuit such as a Schmitt circuit. Numeral 17 designates a relay circuit; 17a a transistor actuated by the signal from the fixed voltage level detector circuit 16; 17b an exciting coil energized by the conduction of the transistor 17a; 17c a movable contact adapted to come into contact with a fixed contact 17d by the electromagnetic attraction of the exciting coil 17b. The relay circuit consisting of the exciting coil 17b, movable contact 17c and fixed contact 17d may be replaced with a transistor relay circuit. Numeral 18 designates a braking force releasing solenoid valve which is energized upon the closure of the movable contact 17c and the fixed contact 17d to reduce the hydraulic pressure in the brake system (not show), thereby releasing the braking force applied to the vehicle. Numeral 19 designates a brake switch so designed that it closes upon application of the brakes to the vehicle. Numeral 20 designates an AND circuit to perform a logical operation on the signal produced by the opening and closing of the movable contact 17c and fixed contact 17d and the signal produced by the opening and closing of the brake switch 19. Numeral 21 designates a switch element; 21a an exciting coil; 21b a movable contact; 21c a fixed contact, the exciting coil 21a being adapted to be energized by the actuation of the AND circuit 20 to thereby close the movable contact 21b and the fixed contact 21c. Although a relay is employed for the switch element 21 in this embodiment as described above, this relay may be replaced, for example, by a transistor switch element. Numeral 22 designates a holding circuit adapted to maintain the continued energization of the exciting coil 21a even after the output of the AND circuit 20 has ceased to exist subsequently to the closing of the movable contact 21b and the fixed contact 21c. Numeral 23 designates another switch element adapted to forcedly interrupt the holding operation of the holding circuit 22 and being so designed that it is normally closed. Here, this switch element 23 may be readily made into a switch which is interlocked with the clutch or the accelerator. Numeral 24 designates a clutch releasing solenoid adapted to be energized upon the closing of the movable contact 21b and the fixed contact 21c to release the clutch which is not shown. Numeral 25 designates a terminal for connection with the positive terminal of a power source which is not shown.

With the construction described above, the operation of the device according to the present invention will be explained. As those skilled in the art will appreciate, although capacitor 11c tends to some extent smooth out the rectified output from generator 11a, because the wheel speed-detection circuit 11 possesses a finite time constant (as determined by capacitor 11c and resistor 11d), it is unavoidable that some residual alternating component will remain having some peak-to-peak magnitude. As those in the art will again appreciate, it is evident from FIG. 2 that if the portion ($\alpha$) of this ripple appearing across terminals A and C even exceeds the effective voltage between terminals B & C, then the gate voltage FET 15 will become positive to produce a brake release signal even though the vehicle is running at a constant speed and no brake is being applied. Therefore, in the present invention the voltage between the taps B and C is chosen to take on a predetermined value so to insure that the minimum value of voltage between tapes A and C does not become smaller than the voltage across capacitor 12a when the vehicle is in a normal running state. Initially, it is predetermined so that the value for the divided voltage developed across the taps B and C of the resistor 11d is larger than that of the alternating component $\alpha$ included in the divided voltage appearing across the taps A and C. Now, as the car is running under normal driving conditions without the application of any braking force to the vehicle, a DC voltage is developed across the taps A and D of the resistor 11d which is proportional to the wheel speed. Of this DC voltage, the voltage developed across the taps A and D charges the capacitor 12a and simultaneously supplies a current whose value corresponds to the predetermined wheel deceleration of 0.6 g. through the collector and the emitter of the transistor 12b. In this case, the amount of current that flows through the collector and the emitter of the transistor 12b is predetermined to correspond to the aforesaid preset wheel deceleration of 0.6 g. in accordance with the ohmic value of the resistor 12c connected to the base of this transistor, and therefore the divided voltage developed across the taps A and B of the resistor 11d directly appears across the terminals of the capacitor 12a. On the other hand, since the divided voltage developed across the taps B and C of the resistor 11d has a value larger than that of the alternating component $\alpha$ included in the divided voltage which appears across the taps A and C of the resistor 11d as previously explained, during normal driving of the vehicle a negative voltage is developed on the side of the tap C connected to the gate of the field effect transistor 15. As a result, the field effect transistor 15 remains in a cutoff condition. This in turn places the fixed voltage level detector circuit 16 in its quiescent state and the transistor 17a in cutoff condition with the result that no current is supplied to the braking force releasing solenoid value 18 and thus the braking fore applied to the vehicle will not be released in any way.

Now assuming that the braking force is applied to the vehicle through the operation of the brakes, the wheel speed drops with a certain deceleration. If, in the course of this drop in the wheel speed, the divided voltage across the taps A and C of the resistor 11d representing a first wheel speed voltage drops below the terminal voltage of the capacitor 12a representing the reference wheel speed voltage, the positive voltage across the capacitor 12a is applied to the gate of the field effect transistor 15 through the taps A and C of the resistor 11d and through the fixed contact 14c and the movable contact 14b. In short, a braking force releasing signal is produced. This means that the resistor 11d, the capacitor 12a, etc. constitute a circuit which compares the first wheel speed voltage and the reference wheel speed voltage to detect the wheel deceleration. Then, as said braking force releasing signal conducts the transistor 15 which in turn actuates the fixed voltage level detector circuit 16, and as the signal voltage from the fixed voltage detector circuit 16 turns the transistor 17a on to supply current to the exciting coil 17b, the movable contact 17c and the fixed contact 17d close to energize the braking force releasing the solenoid valve 18 so that the solenoid valve operates to reduce the hydraulic pressure in the hydraulic brake system to thereby release the braking force applied to the vehicle, In the meantime, since the brake pedal is being depressed by the driver thus closing the brake switch 19 and the movable contact 17c and the fixed contact 17d in the relay circuit are also closed, the AND circuit 20 is actuated to energize the exciting coil 21a. This closes the movable contact 21b and the fixed contact 21c to energize the clutch releasing solenoid 24 which in turn forces the clutch into its uncoupling position. Furthermore, upon closing of the movable contact 21b and the fixed contact 21c, the holding circuit 22 maintains the continued energization of the exciting coil 21a so that the clutch releasing solenoid 24 remains continuously energized, even after the AND circuit 20 has been subsequently cutoff. When this happens, so long as the switch element 23 is not deenergized, the clutch continues to be disengaged by the first braking force releasing signal even if the wheels have stopped rotating and the engine continues to run without a load. On the other hand, the closing of the movable contact 17c and the fixed contact 17d supplies current to the exciting coil 14a of the wheel speed voltage changeover circuit 14 with a result that the movable contact 14b is caused to break away from the fixed contact 14c and it then comes into contact with the fixed contact 14d. In this case, if the reference wheel speed voltage across the capacitor 12a is extremely high as compared to a second wheel speed voltage developed across the taps A and D of the resistor 11d, that is, if the wheel speed drops with an extremely large deceleration as compared to the predetermined wheel deceleration of 0.6 g. the positive voltage from the capacitor 12a is continued to be applied to the gate of the field effect transistor 15 and thus the braking force releasing signal is continuously provided. This maintains the continued supply of current to the braking force releasing solenoid valve 18 so that the braking force applied to the vehicle is continuously released until the wheel speed starts to rise again. However, if the reference wheel speed voltage across the capacitor 12a happens to be lower than the second wheel speed voltage developed across the taps A and D of the resistor 11d when the movable contact 14b has been shifted to make contact with the fixed contact 14d, that is, if the wheel deceleration being developed in the wheel at this instance is not so large as compared to the predetermined wheel deceleration of 0.6 g., for example, a negative voltage appears again across the gate and the ground of the field effect transistor 15 and it becomes nonconductive again. This causes the fixed voltage level detector circuit 16 to be in its quiescent state and cuts off the transistor 17a with the result that the exciting coil 17b is deenergized to open the movable contact 17c and the fixed contact 17d. When this happens, the supply of current to the braking force releasing solenoid valve 18 is stopped and the braking force is applied again to the vehicle, while the supply of current to the exciting coil 14a is also interrupted and thus the movable contact 14b is returned to make contact with the fixed contact 14c with which it was originally closed. In this case, if the first wheel speed voltage across the taps A and C of the resistor 11d is lower than the reference wheel speed voltage across the capacitor 12a, the procedure of the operations described above may be repeated.

In this way, the vehicle can be efficiently braked without stopping the rotation of the wheels. Moreover, once the first braking force releasing signal has been provided, the clutch remains disengaged unless the switch element 23 is deenergized and the engine runs without any load thereon. Thus, no skidding by the vehicle will take place, and accelerate the vehicle, the driver may temporarily deenergize the switch element 23 and engage the clutch to couple the engine and the wheels to each other so that the wheels will be rotated by means of the engine to thereby accelerate the vehicle with considerable smoothness, even on those road surfaces where the friction coefficient between the wheel and the road is small as in the case of a snowy frozen road surface.

In addition, the reason for the provision of the first and second wheel speed voltages in the above-described embodiment resides in the fact that it is intended to effect the early application of the braking force releasing signal and the braking force application signal for the purpose of positively compensating for any possible delay in the operation of the brake system and of realizing a reduced stopping distance by reducing the time required for forcedly releasing the braking force as much as possible. It must be noted here that if the vehicle in question does not involve any problem of delay in the operation of the brake system and if the intended purpose is to prevent skidding by the vehicle due to the stoppage of rotation of the wheels, only a single wheel speed voltage may be advantageously provided to satisfactorily prevent the possibility of the vehicles skidding.

We claim:

1. An antiskid device with clutch-releasing means comprising a wheel detection circuit adapted to convert the speed of a wheel into a DC voltage and produce a wheel speed voltage from said DC voltage, a reference wheel speed-establishing circuit adapted to store said DC voltage across a capacitor and discharge the stored charge in said capacitor with a time constant corresponding to a predetermined wheel deceleration to produce a reference wheel speed, a circuit for comparing the wheel speed voltage from said wheel speed-detection circuit and the terminal voltage of said capacitor representing the reference wheel speed voltage from said reference wheel speed-establishing circuit to detect the wheel deceleration, a relay circuit actuated by the output from said comparing circuit to energize a braking force releasing solenoid valve, an AND circuit adapted to perform a logical operation on the signal from said relay circuit and the signal produced by the opening and closing of a brake switch, a switch element adapted to energize a clutch-releasing solenoid by the output from said AND circuit, a holding circuit adapted to be actuated by the closing of said switch element to maintain the continued energization of said clutch-releasing solenoid even after the output from said AND circuit has ceased to exist, and a switch element to force the operation of said holding circuit to cease.